United States Patent
Chiu

(10) Patent No.: US 7,639,871 B2
(45) Date of Patent: Dec. 29, 2009

(54) METHOD FOR ELIMINATING COLOR SHIFT PHENOMENON THAT PRODUCES DUE TO HIGH OR LOWER BRIGHTNESS IN AN IMAGE

(75) Inventor: Chun-Ta Chiu, Taipei (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 652 days.

(21) Appl. No.: 11/519,820

(22) Filed: Sep. 13, 2006

(65) Prior Publication Data
US 2008/0063268 A1    Mar. 13, 2008

(51) Int. Cl.
G06K 9/00    (2006.01)
G06K 9/40    (2006.01)
G03F 3/08    (2006.01)
(52) U.S. Cl. .................. 382/167; 382/274; 382/275
(58) Field of Classification Search .......... 382/162, 382/164, 165, 167, 254, 260–264, 274–277; 358/1.14, 504, 515, 518, 520, 530; 348/223.1, 348/743; 345/88, 589
See application file for complete search history.

(56) References Cited

U.S. PATENT DOCUMENTS

| | | | |
|---|---|---|---|
| 6,100,861 A * | 8/2000 | Cohen et al. .................. 345/88 |
| 6,160,643 A * | 12/2000 | Deschuytere et al. ....... 358/504 |
| 6,266,105 B1 * | 7/2001 | Gleckman ................... 348/743 |
| 6,480,622 B1 * | 11/2002 | Kim ........................... 382/162 |
| 6,674,415 B2 * | 1/2004 | Nakamura et al. ............. 345/32 |
| 7,423,674 B2 * | 9/2008 | Takeshita .................. 348/223.1 |
| 2006/0007468 A1 * | 1/2006 | Tanaka ....................... 358/1.14 |
| 2007/0071350 A1 * | 3/2007 | Lee et al. .................... 382/260 |
| 2008/0063268 A1 * | 3/2008 | Chiu .......................... 382/167 |

FOREIGN PATENT DOCUMENTS

KR    10-2005-0109364 A    11/2005

* cited by examiner

*Primary Examiner*—Amir Alavi
(74) *Attorney, Agent, or Firm*—Zhigang Ma

(57) ABSTRACT

A method for eliminating color shift phenomenon that produces due to high or lower brightness in an image, includes: firstly, transforming an image datum into a frequency domain with a brightness signal and a chrominance signal; and then adjusting chrominance for each pixel according to judgment of brightness of different pixel in order to eliminate color shift of high or lower brightness. Moreover, because color shift is eliminated by a linear formula, the chrominance of each pixel is changed gradually and no fault.

4 Claims, 1 Drawing Sheet

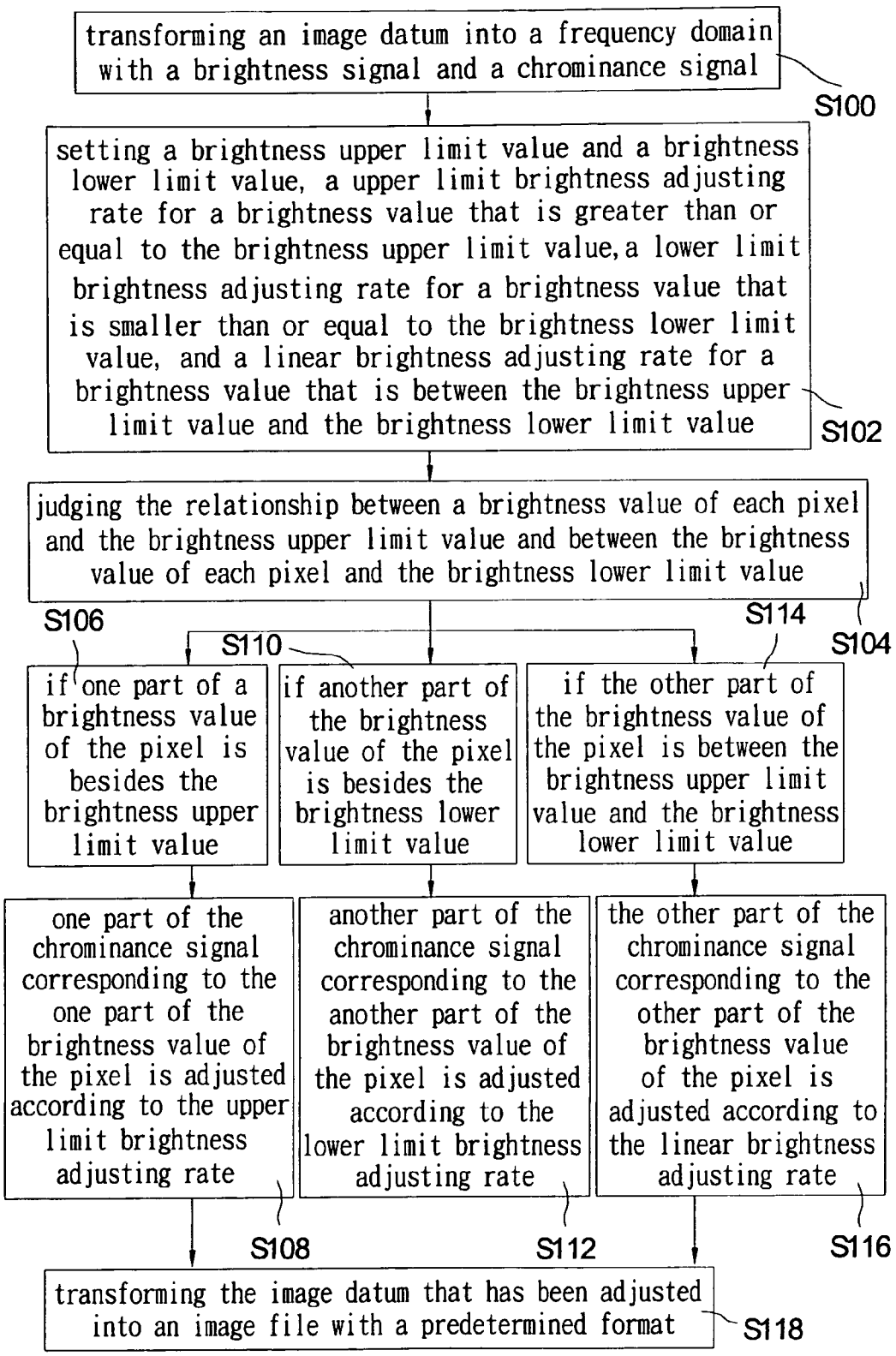

METHOD FOR ELIMINATING COLOR SHIFT PHENOMENON THAT PRODUCES DUE TO HIGH OR LOWER BRIGHTNESS IN AN IMAGE

BACKGROUND OF THE INVENTION

1. Field of The Invention

The present invention relates to a method for eliminating color shift phenomenon that produces due to high or lower brightness in an image, and particularly relates to an image datum that is transformed into a frequency domain with a brightness signal and a chrominance signal. And then the chrominance of each pixel of the image datum is adjusted for a brightness value judgment of each pixel.

2. Description of the Related Art

There are many methods for people to commemorate an occasion. One common way is by taking pictures, because any occasion such as travel, a celebration, an event or any good time that deserves to be commemorated can be recorded via a camera. Moreover, it is convenient for users to transmit image data from the camera to an electronic device such as a computer for modifying the image data. In addition, the price of a camera has become increasingly cheaper, so the number of people using digital cameras increases day by day.

However, when using a digital camera to take a picture, high or lower brightness areas in an image will generate color shift phenomenon. Especially, when needing to enhance the color reproduction via a color matrix, the color shift of high brightness saturation and lower brightness noise is obvious. Hence, the image will generate critical distortion due to a little color shift of a raw image.

SUMMARY OF THE INVENTION

The present invention provides a method for eliminating color shift phenomenon that produces due to high or lower brightness in an image. Firstly, an image datum is transformed into a frequency domain with a brightness signal and a chrominance signal, and then the chrominance of each pixel of the image datum is adjusted for a brightness value judgment of each pixel for eliminating color shift due to high or lower brightness in the image.

Moreover, the chrominance in high or lower brightness does not need to be enhanced. In addition, gray series can obviously improve the color shift question. Hence, it is helpful to decrease chrominance value for decreasing the color shift phenomenon. Furthermore, the color shift phenomenon is eliminated via a linear formula, so that the change is gradual without any fault phenomenon.

One aspect of the present invention is a method for eliminating color shift phenomenon that produces due to high or lower brightness in an image, comprising: transforming an image datum into a frequency domain with a brightness signal and a chrominance signal; and then setting a brightness upper limit value and a brightness lower limit value, a upper limit brightness adjusting rate for a brightness value that is greater than or equal to the brightness upper limit value, a lower limit brightness adjusting rate for a brightness value that is smaller than or equal to the brightness lower limit value, and a linear brightness adjusting rate for a brightness value that is between the brightness upper limit value and the brightness lower limit value.

Moreover, the method further comprises: judging the relationship between a brightness value of each pixel and the brightness upper limit value and between the brightness value of each pixel and the brightness lower limit value. If one part of a brightness value of the pixel is besides the brightness upper limit value, one part of the chrominance signal corresponding to the one part of the brightness value of the pixel is adjusted according to the upper limit brightness adjusting rate. If another part of the brightness value of the pixel is besides the brightness lower limit value, another part of the chrominance signal corresponding to the another part of the brightness value of the pixel is adjusted according to the lower limit brightness adjusting rate. If the other part of the brightness value of the pixel is between the brightness upper limit value and the brightness lower limit value, the other part of the chrominance signal corresponding to the other part of the brightness value of the pixel is adjusted according to the linear brightness adjusting rate. Finally, the image datum that has been adjusted is transformed into an image file with a predetermined format.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which:

The FIGURE is flow chart of a method for eliminating color shift phenomenon that produces due to high or lower brightness in an image according to the present invention.

DETAILED DESCRIPTION OF PREFERRED BEST MOLDS

Referring to the FIGURE, the present invention provides a method for eliminating color shift phenomenon that produces due to high or lower brightness in an image, comprising: transforming an image datum into a frequency domain with a brightness signal and a chrominance signal (S100). In addition, the frequency domain is a YUV domain, a Lab domain, or any domain with brightness and chrominance signals.

Moreover, the method comprises: setting a brightness upper limit value and a brightness lower limit value, a upper limit brightness adjusting rate for a brightness value that is greater than or equal to the brightness upper limit value, a lower limit brightness adjusting rate for a brightness value that is smaller than or equal to the brightness lower limit value, and a linear brightness adjusting rate for a brightness value that is between the brightness upper limit value and the brightness lower limit value (S102).

Furthermore, the method comprises: judging the relationship between a brightness value of each pixel and the brightness upper limit value and between the brightness value of each pixel and the brightness lower limit value (S104). If one part of a brightness value of the pixel is besides the brightness upper limit value (S106), one part of the chrominance signal corresponding to the one part of the brightness value of the pixel is adjusted according to the upper limit brightness adjusting rate (S108). If another part of the brightness value of the pixel is besides the brightness lower limit value (S110), another part of the chrominance signal corresponding to the another part of the brightness value of the pixel is adjusted according to the lower limit brightness adjusting rate (S112). If the other part of the brightness value of the pixel is between the brightness upper limit value and the brightness lower limit value (S114), the other part of the chrominance signal corresponding to the other part of the brightness value of the pixel is adjusted according to the linear brightness adjusting rate (S116). In addition, finally the method comprises transforming the image datum that has been adjusted into an image file with a predetermined format (S118), such as JPEG (Joint Photographic Experts Group) file.

For example the YUV domain, Y is a brightness signal, UV is a chrominance signal, and a brightness value of a pixel of a general image datum is between 0~255.

Assumption:

1. In lower brightness area, the brightness upper limit value and the brightness lower limit value are set to 30 and 10 respectively;

2. The upper limit brightness adjusting rate is set to 100% for a brightness value that is larger than or equal to the brightness upper limit value 30. Hence, an original chrominance of one part of the pixel is maintained for a brightness value of the one part of the pixel that is larger than or equal to the brightness upper limit value 30;

3. The lower limit brightness adjusting rate is set to 50% for a brightness value that is less than or equal to the brightness lower limit value 10. Hence, the original chrominance of another part of the pixel multiples 50% for the brightness value of another part of the pixel that is less than or equal to the brightness lower limit value 10. In other words, the chrominance is decreased 50% for the brightness value 0~10; and 4. A linear brightness adjusting rate is set for a brightness value that is between the brightness upper limit value 30 and the brightness lower limit value 10. The linear brightness adjusting rate is figured out by a formula as follows:

$$f(Y, \text{Rat}) = \left((100 - \text{Rat}) * \frac{(Y - Y_1)}{(Y_2 - Y_1)}\right) + \text{Rat},$$

wherein, f (Y, Rat)=linear brightness adjusting rate;
Y=brightness of each pixel;
$Y_1$=brightness lower limit value;
$Y^2$=brightness upper limit value; and
Rat=lower limit brightness adjusting rate.

Hence, the original chrominance of the other part of the pixel correspondingly multiples the linear brightness adjusting rate for the brightness value of the other part of the pixel that is between the brightness upper limit value 30 and the brightness lower limit value 10. For example, for a pixel its brightness value is 29, the linear brightness adjusting rate is figured out as follows:

$$f(29, 50) = \left((100 - 50) * \frac{(29 - 10)}{(30 - 10)}\right) + 50 = 97.5,$$

Hence, the original chrominance of the pixel with the brightness value 29 multiples 97.5%, and other pixel's calculation method the same as above-mentioned steps.

On the same principle, when assuming that in high brightness area the brightness upper limit value and the brightness lower limit value are set to 250 and 220 respectively, the difference between the high brightness area and the lower brightness area is that:

1. The upper limit brightness adjusting rate is set to 50% for a brightness value that is larger than or equal to the brightness upper limit value 250. Hence, an original chrominance of one part of the pixel multiples 50% for a brightness value of the one part of the pixel that is larger than or equal to the brightness upper limit value 250. In other words, the chrominance is decreased 50% for the brightness value 250~255; and 2. The lower limit brightness adjusting rate is set to 100% for a brightness value that is less than or equal to the brightness lower limit value 220. Hence, the original chrominance of another part of the pixel is maintained for the brightness value of the another part of the pixel that is less than or equal to the brightness lower limit value 220; and 3. Rat is changed into the upper limit brightness adjusting rate 50%.

To sum up above-mentioned examples, the brightness value that is between 0~10 and 250~255 needs to be decreased 50%. The brightness value that is between 30~220 can maintain original chrominance. In addition, the brightness value that is between 10~30 and 220~250 needs to be decreased according to the different linear brightness adjusting rates. Hence, the method of the present invention for adjusting the chrominance of each pixel is that: an original chrominance of each pixel multiples a corresponding brightness adjusting rate that is obtained according different brightness of different pixels.

In conclusion, in the present invention, firstly an image datum is transformed into a frequency domain with a brightness signal and a chrominance signal, and then the chrominance of each pixel of the image datum is adjusted for a brightness value judgment of each pixel for eliminating color shift due to high or lower brightness in the image.

Moreover, the chrominance in high or lower brightness does not need to be enhanced. In addition, gray series can obviously improve the color shift question. Hence, it is helpful to decrease chrominance value for decreasing the color shift phenomenon. Furthermore, the color shift phenomenon is eliminated via a linear formula, so that the change is gradual without any fault phenomenon.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for eliminating color shift phenomenon that produces due to high or lower brightness in an image, comprising:

transforming an image datum into a frequency domain with a brightness signal and a chrominance signal;

setting a brightness upper limit value and a brightness lower limit value, a upper limit brightness adjusting rate for a brightness value that is greater than or equal to the brightness upper limit value, a lower limit brightness adjusting rate for a brightness value that is smaller than or equal to the brightness lower limit value, and a linear brightness adjusting rate for a brightness value that is between the brightness upper limit value and the brightness lower limit value;

judging the relationship between a brightness value of each pixel and the brightness upper limit value and between the brightness value of each pixel and the brightness lower limit value;

wherein if one part of a brightness value of the pixel is besides the brightness upper limit value, one part of the chrominance signal corresponding to the one part of the brightness value of the pixel is adjusted according to the upper limit brightness adjusting rate;

wherein if another part of the brightness value of the pixel is besides the brightness lower limit value, another part of the chrominance signal corresponding to the another part of the brightness value of the pixel is adjusted according to the lower limit brightness adjusting rate;

wherein if the other part of the brightness value of the pixel is between the brightness upper limit value and the brightness lower limit value, the other part of the chrominance signal corresponding to the other part of the brightness value of the pixel is adjusted according to the linear brightness adjusting rate; and transforming the image datum that has been adjusted into an image file with a predetermined format.

2. The method as claimed in claim 1, wherein the frequency domain is a YUV domain or a Lab domain.

3. The method as claimed in claim 1, wherein the linear brightness adjusting rate is figured out by a formula as follows:

$$f(Y, \text{Rat}) = \left((100 - \text{Rat}) * \frac{(Y - Y_1)}{(Y_2 - Y_1)}\right) + \text{Rat},$$

wherein, $f(Y, \text{Rat})$=linear brightness adjusting rate;
$Y$=brightness of each pixel;
$Y_1$=brightness lower limit value;
$Y^2$=brightness upper limit value; and
Rat=lower limit brightness adjusting rate.

4. The method as claimed in claim 1, wherein the step of adjusting the chrominance of each pixel is that: an original chrominance of each pixel multiples a corresponding brightness adjusting rate that is obtained according different brightness of different pixels.

* * * * *

UNITED STATES PATENT AND TRADEMARK OFFICE
CERTIFICATE OF CORRECTION

PATENT NO. : 7,639,871 B2  Page 1 of 1
APPLICATION NO. : 11/519820
DATED : December 29, 2009
INVENTOR(S) : Chun-Ta Chiu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 759 days.

Signed and Sealed this

Ninth Day of November, 2010

David J. Kappos
*Director of the United States Patent and Trademark Office*